Dec. 1, 1936.  G. FUCHS ET AL  2,062,647
MACHINE FOR THE ELECTRIC WELDING OF THE FEET OF KNITTING MACHINE NEEDLES
Original Filed Aug. 10, 1932
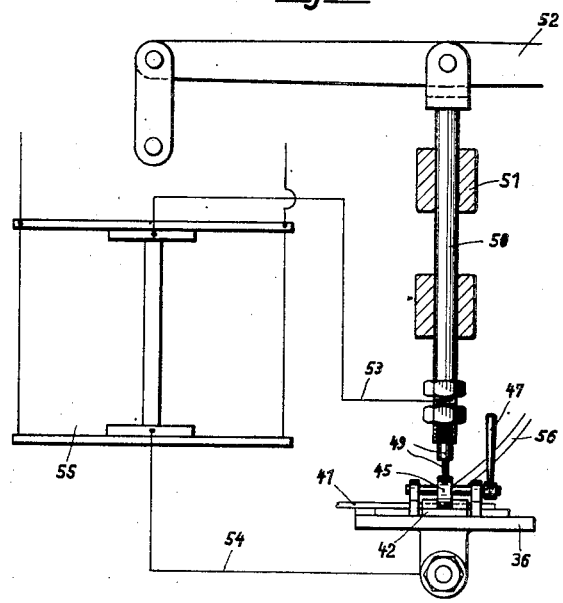
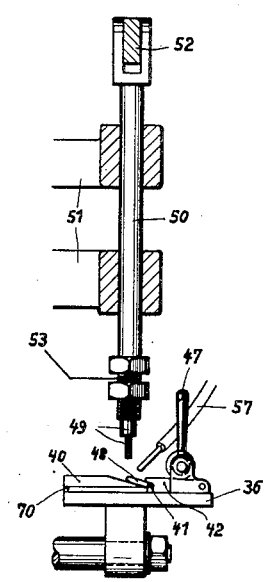
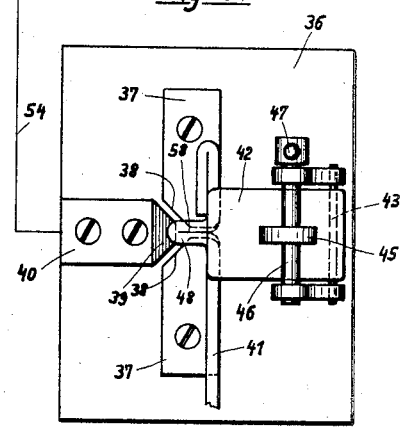
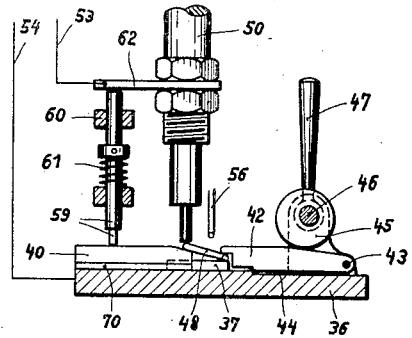
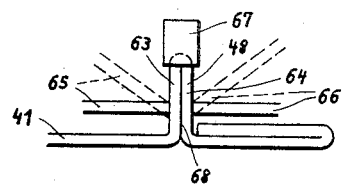

Patented Dec. 1, 1936

2,062,647

UNITED STATES PATENT OFFICE 2,062,647

MACHINE FOR THE ELECTRIC WELDING OF THE FEET OF KNITTING MACHINE NEEDLES

Gottfried Fuchs and Hermann Späth, Stuttgart-Cannstatt, Germany

Original application August 10, 1932, Serial No. 628,200. Divided and this application July 21, 1933, Serial No. 681,536. In Germany June 9, 1932

2 Claims. (Cl. 219—4)

This invention relates to an apparatus for welding or soldering together the arms of the feet of knitting machine needles, and constitutes a division of our prior application filed August 10, 1932, since matured into Patent No. 1,978,363, dated October 23rd, 1934.

The material of the knitting machine needles is weakened very much owing to the formation of the foot on the bending point. This portion of the needle is very strongly stressed, so that it frequently happens, that the foot breaks off on the bending point. To avoid this inconvenience, it has been proposed, to provide a ferrule on the foot, which had to be separately fixed, this requiring time and being complicated.

According to the invention the connecting of the arms of the foot on knitting machine needles is effected by rigidly connecting the arms of the feet between the joint by hard soldering or welding. The movable electrode is brought into contact with the end of the foot, whereas the other pole is connected with the work piece. After the application of the flux and solder the movable electrode is brought into contact with the foot of the knitting machine needle for closing the circuit, whereby the solder is melted.

If the arms of the foot have to be connected the one with the other by welding, the circuit is closed between the two arms. This is attained in that the electrodes are movably mounted, which are to be connected with the arms of the foot, whereby the arms bearing the one against the other are welded together at the contacting points of the electrodes. The upper portion of the foot is held by a plate or clamp, which reinforces the material so that the arms of the foot do not heat at all or only slightly. Owing to this soldering or welding of the arms of the foot it is no longer necessary to fit a collar or wire ring on the foot of the knitting machine needle.

An embodiment of the invention is illustrated by way of example in the accompanying drawing in which:

Fig. 1 shows in front elevation a machine for welding or soldering the feet on knitting machine needles.

Fig. 2 is a side elevation of Fig. 1.

Fig. 3 shows in top plan view the machine table on larger scale.

Fig. 4 is a side elevation of Fig. 3.

Fig. 5 illustrates the welding process.

As shown in the drawing two separate plates 37 are fixed on the machine table 36 a short distance apart. The opposite narrow sides of the plates 37 have angular portions 38 cut out with which a plate 40 engages which has a truncated point 39, this point being bevelled in outward direction. The plates 37 carry the work 41 held in position by a plate 42. This plate 42 is pivotable around a pin 43 of the table 36 and controlled by a spring 44 which has the tendency to permanently press upward the plate 42. The clamping plate 42 is pressed down by an eccentric 45 which is operated by a hand lever 47 mounted on an axle 46. The foot 48 of the needle 41 is lying upon the bevelled end 39 of the pole plate 40, which is fixed on the table 36 insulated by an insulating plate 70.

An electrode 49, movable in vertical direction, is mounted above the end of the foot 48 of the needle 41. This electrode 49 is fixed in a rod 50, shiftably mounted in a bracket 51 of the machine frame. The rod 50 can be moved up and down by a hand lever 52 or by a pedal or mechanically by a motor. The electrode 49 is in connection with a lead 53 and the table plate 36 with a lead 54, said leads branching off from a transformer 55. At the side of the electrode a tube 56 for supplying solder and a tube 57 for supplying flux are arranged. The solder is supplied through the tube 56 in the form of small grains. At every depression of the electrode 49 a small grain of solder is withdrawn from the tube 56 and brought into the joint 58 of the foot 48 of the needle 41 (Fig. 3). At the descending of the electrode also a drop of flux is applied at the same time on to the joint 58. In larger workshops an auxiliary electrode 59 is arranged at the side of the electrode 49 in guides 60. This auxiliary electrode 59 is permanently pressed upwards by the action of a spring 61. An arm 62, fixed on the rod 50, moves also the auxiliary electrode 59 when the electrode 49 is descending and presses this auxiliary electrode against the plate 40, so that the foot 48 is held between two like poles. As soon as the electrodes 49 and 59 have been connected with the foot 48 of the needle 41, the circuit 53 and 54 is closed, so that the foot 48 is heated to red heat, whereby the solder is molten. If the rod 50 is liberated, the electrodes 49 and 59 ascend and the circuit 53, 54 is cut out. After the clamping plate 42 has been removed the needle 41 can be withdrawn and a fresh needle inserted.

If the foot 48 of the needle 41 has to be welded, the arms 63 and 64 of the foot 48 are brought into contact with two electrodes 65 and 66 at the point at which the welding of the foot 48 has to be done. The electrodes 65 and 66 may be in alinement or inclined the one relative to the other. The upper end of the foot is securely held by a plate or clamp 67, which forms at the same time the material for weakening the current. The arms 63 and 64 are welded together only at the point 68 at which the electrodes 65 and 66 are in contact.

We claim:—

1. A machine for connecting together the arms of the feet on knitting machine needles, comprising in combination a machine table, two plates arranged at a distance apart on said table and adapted to support the arms of the feet of the knitting machine needle, a pole plate extending between said spaced plates and adapted to support the end of the needle foot, an insulating plate under said pole plate insulating said pole plate from said machine table, a gripper plate hingedly mounted on said table opposite said pole plate and overlapping said supporting plates, said gripper plate adapted to cooperate with said supporting plates to clamp the arms of the workpiece, an eccentric arranged above said gripper plate adapted to press and hold said gripper plate tightly against the workpiece, and an electrode movably mounted above said insulated pole plate and adapted to be brought into contact with the end of the foot.

2. A machine for connecting together the arms of the feet on knitting machine needles, comprising in combination a machine table, two plates arranged at a distance apart on said table and adapted to support the arms of the feet of the knitting machine needle, a pole plate extending between said spaced plates and adapted to support the end of the needle foot, an insulating plate under said pole plate insulating said pole plate from said machine table, a gripper plate hingedly mounted on said table opposite said pole plate and overlapping said supporting plates, said gripper plate adapted to cooperate with said supporting plates to clamp the arms of the workpiece, an eccentric arranged above said gripper plate adapted to press and hold said gripper plate tightly against the workpiece, an electrode movably mounted above said insulated pole plate and adapted to be brought into contact with the end of the foot, an auxiliary electrode movably mounted at the side of and conductively connected to said electrode, and means for pressing said auxiliary electrode against said insulated plate during the descending movement of said electrode so that the foot is electrically connected with two like poles, namely directly with said electrode on one side and indirectly with said auxiliary electrode through said insulated plate on the other side.

GOTTFRIED FUCHS.
HERMANN SPÄTH.